(12) United States Patent
Naber

(10) Patent No.: US 8,814,184 B2
(45) Date of Patent: Aug. 26, 2014

(54) AXLE-LIFTING DEVICE AND METHOD FOR LIFTING AN AXLE

(75) Inventor: Thomas Naber, Ahaus (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 150 days.

(21) Appl. No.: 12/736,363

(22) PCT Filed: Apr. 8, 2009

(86) PCT No.: PCT/EP2009/002591
§ 371 (c)(1),
(2), (4) Date: Dec. 14, 2010

(87) PCT Pub. No.: WO2009/124741
PCT Pub. Date: Oct. 15, 2009

(65) Prior Publication Data
US 2011/0175301 A1    Jul. 21, 2011

(30) Foreign Application Priority Data

Apr. 8, 2008  (DE) .......................... 10 2008 017 702

(51) Int. Cl.
*B62D 61/12* (2006.01)
*B60G 9/00* (2006.01)
*B60G 11/27* (2006.01)
*B60G 17/015* (2006.01)

(52) U.S. Cl.
CPC ............... *B62D 61/12* (2013.01); *B60G 9/003* (2013.01); *B60G 11/27* (2013.01); *B60G 17/0152* (2013.01); *B60G 2200/31* (2013.01); *B60G 2202/41* (2013.01); *B60G 2204/47* (2013.01); *B60G 2300/02* (2013.01); *B60G 2300/04* (2013.01); *B60G 2400/60* (2013.01); *B60G 2500/30* (2013.01)
USPC ......................... 280/86.5; 180/24.02; 180/209

(58) Field of Classification Search
CPC .............................. B62D 61/12; B62D 61/125
USPC .............. 280/5.5, 86.5, 9, 43; 180/24.02, 209
See application file for complete search history.

(56) References Cited

U.S. PATENT DOCUMENTS 4,089,544 A * 5/1978 Raidel .......................... 280/86.5
4,102,424 A * 7/1978 Heinze ....................... 180/24.02
(Continued)

FOREIGN PATENT DOCUMENTS

DE  896 311    11/1953
DE  22 10 070    9/1973
(Continued)

OTHER PUBLICATIONS

European Patent Office, International Preliminary Report on Patentability and Written Opinion, Oct. 21, 2010, from International Patent Application No. PCT/EP2009/002591, filed on Apr. 8, 2009.
(Continued)

*Primary Examiner* — James English
(74) *Attorney, Agent, or Firm* — Kenyon & Kenyon LLP

(57) ABSTRACT

An axle-lifting device for lifting an axle of a vehicle. The axle-lifting device includes a function mechanism for generating a force component in an axle-lifting direction. The function mechanism is configured to generate a first force component for providing a first functionality and a second force component for lifting the axle in the axle-lifting direction.

11 Claims, 1 Drawing Sheet

(56) References Cited

U.S. PATENT DOCUMENTS

| | | | | |
|---|---|---|---|---|
| 4,783,089 | A | * | 11/1988 | Hamilton et al. ........... 280/6.157 |
| 4,854,409 | A | * | 8/1989 | Hillebrand et al. ........ 180/24.02 |
| 4,944,526 | A | * | 7/1990 | Eberling ....................... 280/86.5 |
| 5,025,877 | A | * | 6/1991 | Assh ........................... 180/24.02 |
| 5,193,063 | A | * | 3/1993 | Assh ............................... 701/39 |
| 5,231,583 | A | | 7/1993 | Lizell |
| 5,332,258 | A | * | 7/1994 | Buttner ........................ 280/86.5 |
| 5,356,162 | A | * | 10/1994 | Derrien ..................... 280/43.18 |
| 5,597,174 | A | * | 1/1997 | Christenson et al. ........ 280/86.5 |
| 6,003,885 | A | * | 12/1999 | Richardson .................. 280/86.5 |
| 6,073,946 | A | * | 6/2000 | Richardson .................. 280/86.5 |
| 6,715,778 | B2 | * | 4/2004 | Gottschalk et al. .... 280/124.157 |
| 7,677,339 | B2 | * | 3/2010 | Oscarsson .................. 180/24.02 |
| 7,740,252 | B2 | * | 6/2010 | Strong ......................... 280/86.5 |
| 2002/0066605 | A1 | * | 6/2002 | McClelland et al. ....... 180/24.02 |
| 2005/0093260 | A1 | * | 5/2005 | Trescott ....................... 280/86.5 |
| 2006/0267296 | A1 | * | 11/2006 | Dodd et al. ................. 280/5.512 |
| 2007/0221054 | A1 | * | 9/2007 | Webster et al. ................. 91/394 |

FOREIGN PATENT DOCUMENTS

| | | |
|---|---|---|
| DE | 23 59 690 | 6/1975 |
| DE | 41 27 801 | 2/1993 |
| DE | 42 09 038 | 9/1993 |
| EP | 0 299 949 | 1/1989 |
| JP | 05 162525 | 6/1993 |
| WO | 2008/038321 | 4/2008 |

OTHER PUBLICATIONS

European Patent Office, Translation of international Preliminary Report on Patentability and Written Opinion, Dec. 9, 2010, from International Patent Application No. PCT/EP2009/002591, filed on Apr. 8, 2009.

* cited by examiner

AXLE-LIFTING DEVICE AND METHOD FOR LIFTING AN AXLE

THE FIELD OF THE INVENTION

The present invention relates to an axle-lifting device, a method for lifting an axle and axle assemblies which may be used in vehicles.

BACKGROUND INFORMATION

The axles and axle assemblies of vehicles are designed for a predetermined load. In vehicles having a very high ratio of empty/loaded, the problem encountered during "empty" or "partially loaded" load states is that the actual load on the axles and assemblies is much lower than the design load. This may lead to disproportionate wear on the tires and brake pads, among other things, in relation to the use of the axle, namely the load carried.

This problem is usually solved by an axle-lifting device, for example, an axle lift, which lifts the axle and parts of the assembly in the "empty" and "partially loaded" states and thus solves the aforementioned problem. The axle lift is a separate component, which has only the purpose of lifting the axle. In more recent modular approaches, an axle lift may also be retrofitted.

SUMMARY OF THE INVENTION

An object of the exemplary embodiments and/or exemplary methods of the present invention is to create an improved axle-lifting device, an improved method for lifting an axle and an improved axle assembly.

This object is achieved by an axle-lifting device as recited herein, a method for lifting an axle as recited herein, and an axle assembly as recited herein.

The exemplary embodiments and/or exemplary methods of the present invention is based on the idea that axle components or axle assembly components, which are usually present, may be used to lift an axle by slightly modifying the axle components or axle assembly components which are usually present.

According to the exemplary embodiments and/or exemplary methods of the present invention, all the components which are capable of directly or indirectly generating a force component in the axle-lifting direction according to their task may be considered for this purpose. Thus, a force required to lift the axle may be generated by a force-generating component, which is already present on the vehicle and is also used for other purposes.

It is advantageously possible for the components, which are used for lifting the axle according to the present invention, to continue to fulfill the task for which they were originally provided. Thus only a few additional components or none at all are necessary for lifting the axle.

The exemplary embodiments and/or exemplary methods of the present invention creates an axle-lifting device for lifting an axle of a vehicle, having the following features:

A function mechanism for generating a force component in an axle-lifting direction, the function mechanism being designed to generate a first force component for providing a first functionality and to generate a second force component to lift the axle in the axle-lifting direction.

According to one embodiment, the function mechanism may be a shock absorber, which is already present. Shock absorbers are usually operated with a fluid and dissipate the energy introduced due to bumps in the road by converting it into heat at a throttle point. Forces are thus generated in the spring compression and spring deflection directions. A set-up and activation of the shock absorber according to the present invention makes it possible to use this shock absorber force to lift the axle. In this way, a component which already exists may be utilized in multiple ways. This allows a separate axle lift to be omitted.

The present invention also creates a method for lifting an axle of a vehicle, having the following steps:

Providing a function mechanism for generating a force component in an axle-lifting direction, the function mechanism being designed to generate a first force component to provide a first functionality and to generate a second force component in the axle-lifting direction to lift the axle; and Providing a control signal to the function mechanism to generate the second force component.

The exemplary embodiments and/or exemplary methods of the present invention also creates an axle assembly having the following features:

A trestle which may be connected to a chassis;

A suspension arm for accommodating an axle, the suspension arm being movably connected to the trestle; and An axle-lifting device as described herein, the axle-lifting device being connected to the suspension arm.

Exemplary embodiments of the present invention are explained in greater detail below with reference to the accompanying drawings.

DETAILED DESCRIPTION

Figure 1:
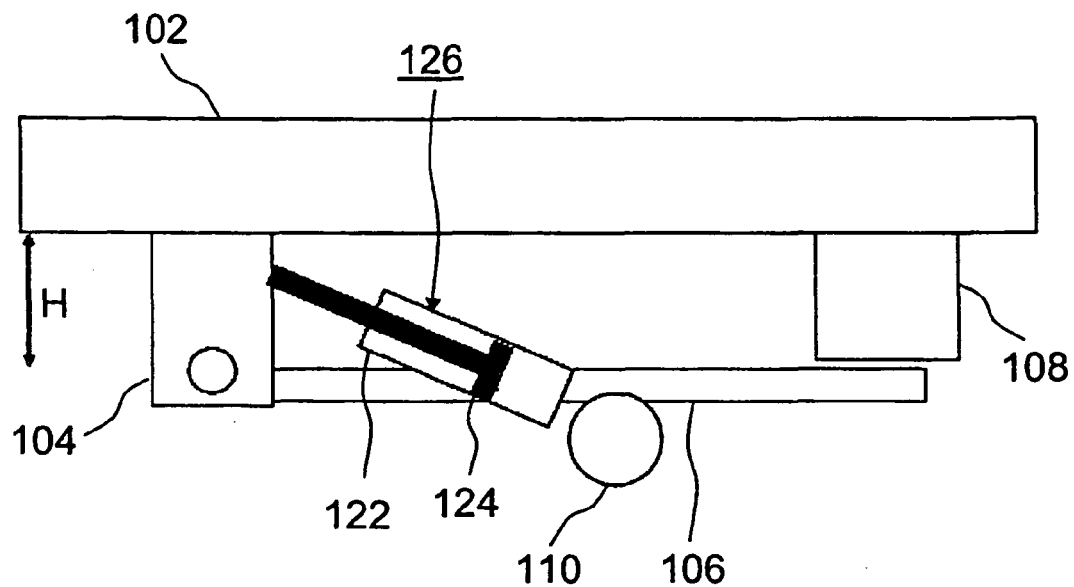
FIG. 1 shows a representation of an assembly having an axle-lifting device according to the present invention.

In the following description of the exemplary embodiments of the present invention, the same or similar reference numerals are used for the similar elements represented in the various drawings, so a repeat description of these elements is omitted here.

FIG. 1 shows an axle assembly having an axle-lifting device according to one exemplary embodiment of the present invention. The axle assembly may be connected to a chassis 102 of a vehicle and has a trestle 104 and a suspension arm 106. Trestle 104 is connected to chassis 102. One end of suspension arm 106 is rotatably mounted on trestle 104. The axle assembly may also have a bellows 108. Bellows 108 is connected to chassis 102 and is designed to absorb a movement of suspension arm 106 in the direction of chassis 102. For this purpose, bellows 108 may be situated on one end of suspension arm 106 opposite trestle 104. Suspension arm 106 is designed to accommodate an axle 110.

The axle assembly has an axle-lifting device having a function mechanism 122. According to this exemplary embodiment, the function mechanism is designed as a shock absorber 122. Shock absorber 122 has a separating piston 124. Furthermore, a fluid is situated within shock absorber 122, so that movement of the separating piston 124 may be dampened. Shock absorber 122 is designed to generate at least one force component in an axle-lifting direction H, which points in the direction of chassis 102. Furthermore, shock absorber 122 may be designed to generate a force component in the opposite direction.

The force component in the axle-lifting direction may cause the lifting of axle 110 or prevent or retard the lowering of axle 110. The force component in the opposite direction may cause a lowering of axle 110 or prevent or retard a lifting of axle 110. Shock absorber 122 may be designed to use the force component in axle-lifting direction H for both lifting of axle 110 and for at least one additional functionality. According to this exemplary embodiment, the additional functionality may include damping or suspension of axle 110.

Due to a predetermined pressure distribution and/or fluid quantity distribution within shock absorber 122, a resting position of the separating piston and thus a height level of axle 110 may be set. A permanent change in the predetermined pressure distribution and/or fluid quantity distribution may cause a displacement of the resting position of separating piston 124. The force component in axle-lifting direction H may be generated due to the displacement of the resting position. A force component may be generated due to pressure acting on space 126 of shock absorber 122 in particular, resulting in the lifting of axle 110. Shock absorber 122 may have a valve for applying pressure to space 126. Alternatively, the valve as well as the necessary force-generating component for the fluid quantity/fluid pressure may also be mounted outside of component 122. A component which also provides fluidic volumes for other purposes, for example, a manually operable hydraulic pump, which is used to lift the driver's cab (in a truck) or to lift a roof panel (on a trailer) may also be used as the force generating component.

The application of pressure to space 126 may take place in response to a supplied control signal. The control signal may be generated by a control device connected to shock absorber 122. Since the load state is proportional to the fluid pressure in fluid suspensions, there may be direct control of the axle-lifting device.

The axle assembly shown in FIG. 1 may be a pneumatic suspension of a truck, a truck trailer or a truck semi-trailer. According to this exemplary embodiment, shock absorber 122 is situated between trestle 104 and suspension arm 106. Shock absorber 122 is connected to trestle 104 in the vicinity of chassis 102 on the one hand, while on the other hand, it is connected to suspension arm 106 in the vicinity of axle 110.

Figure 2:
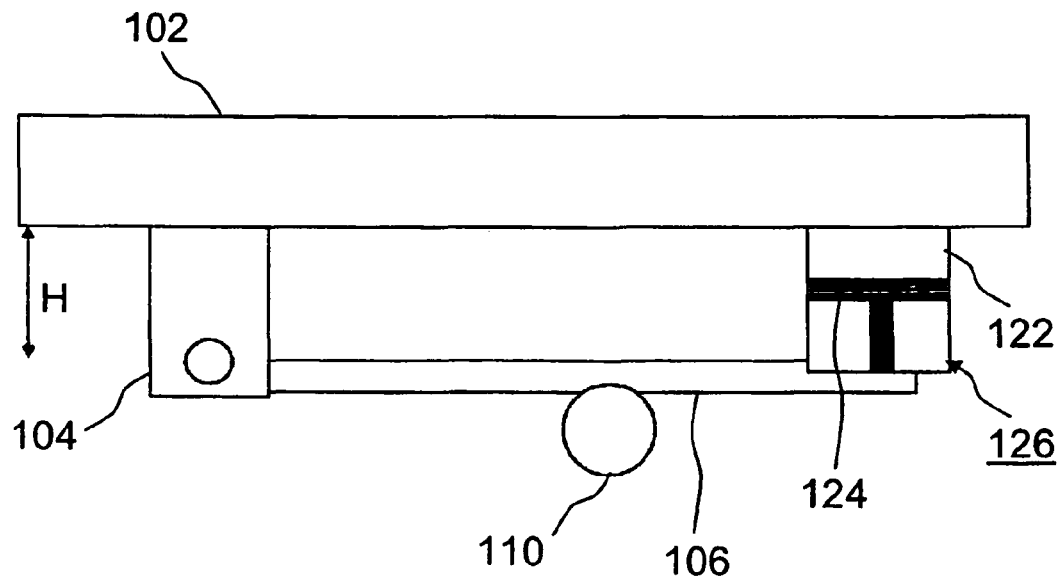
FIG. 2 shows a representation of another assembly having an axle-lifting device according to the present invention.

FIG. 2 shows an axle assembly having an axle-lifting device according to another exemplary embodiment of the present invention. The design of the axle assembly corresponds to the design shown in FIG. 1. According to this exemplary embodiment, function mechanism 122 is designed as a bellows. Bellows 122 has a separating piston 124 and is provided for damping of axle 110 or chassis 102. The damping is thus performed with a compressible fluid, in particular using the same medium, which is also used for the suspension. According to the exemplary embodiments and/or exemplary methods of the present invention, bellows 122 may additionally be used for lifting axle 110. According to the exemplary embodiment illustrated in FIG. 1, applying pressure to space 126 results in axle 110 being lifted.

The assembly shown in FIG. 2 may be a pneumatic suspension of a truck, a truck trailer or a truck semi-trailer having a pneumatic suspension shock absorber. According to this exemplary embodiment, bellows 122 is situated between chassis 102 and suspension arm 106. Bellows 122 is connected on the one hand to chassis 102 and on the other hand to suspension arm 106 at one end, which is opposite trestle 104.

The exemplary embodiments described here are selected only as examples and may be combined with one another. Instead of the shock absorber described here, the axle-lifting device according to the present invention may also be based on any other spring component, shock absorber component or other component, which may be used as an axle-lifting device in addition to its primary function.

The List of Reference Numerals is as follows:
102 chassis
104 trestle
106 suspension arm
108 bellows
110 axle
122 shock absorber
124 separating piston
126 pressure space

What is claimed is:

1. An axle-lifting device for lifting an axle of a vehicle, comprising:
    a function mechanism for generating a force component in an axle-lifting direction,
    wherein the function mechanism is a bellows and is configured to generate the force component in the axle-lifting direction having a first force component to provide a first functionality and having a second force component in the axle-lifting direction to lift the axle;
    wherein the function mechanism includes a separating piston,
    wherein a variation in at least one of an internal fluid pressure and an internal fluid quantity distribution in the function mechanism causes a displacement in a resting position of the separating piston, the force component in the axle-lifting direction being generated as a function of the displacement,
    wherein a load state is proportional to the fluid pressure to provide direct control of the axle-lifting device,
    wherein the function mechanism is configured to provide another force component against the axle-lifting direction for providing the first functionality,
    wherein the function mechanism is configured as the bellows having a shock absorber, the first functionality being a shock-absorbing effect of the shock absorber and the first force component being a shock-absorbing force of the shock absorber,
    wherein the shock absorber houses the separating piston and is configured to induce the second force component by the displacement of the resting position of the separating piston, and
    wherein the bellows is connected to a chassis of the vehicle and to one end of a suspension arm, which is opposite the other end of the suspension arm, which is connected to a trestle connected to the chassis.

2. The axle-lifting device of claim 1, wherein the shock absorber has a valve, and the displacement of the resting position of the separating piston is to be induced by pressure acting on the valve.

3. The axle-lifting device of claim 1, wherein the shock absorber is configured as a pneumatic suspension.

4. The axle-lifting device of claim 1, wherein the function mechanism is configured to generate the second force component in response to a supplied control signal.

5. The axle-lifting device of claim 4, wherein a control unit is configured to supply the control signal to the function mechanism.

6. The axle-lifting device of claim 5, wherein the control unit is configured to supply the control signal as a function of a load state of the vehicle.

7. The axle-lifting device of claim 1, wherein a force required to lift the axle is generated by a force-generating component, which already exists on the vehicle and is also used for other non-force generating functions.

8. A method for lifting an axle of a vehicle, the method comprising:

providing a function mechanism for generating a force component in an axle-lifting direction, the function mechanism being configured to generate a first force component, to provide a first functionality, and to generate a second force component in the axle-lifting direction to lift the axle, wherein the function mechanism includes a separating piston;

supplying a control signal to the function mechanism to generate the second force component; and varying at least one of an internal fluid pressure and an internal fluid quantity distribution in the function mechanism to induce a displacement in a resting position of the separating piston, the force component in the axle-lifting direction being generated as a function of the displacement;

wherein a load state is proportional to the fluid pressure to provide direct control of the axle-lifting device, wherein the function mechanism is configured to provide another force component against the axle-lifting direction for providing the first functionality, wherein the function mechanism is configured as a bellows having a shock absorber, the first functionality being a shock-absorbing effect of the shock absorber and the first force component being a shock-absorbing force of the shock absorber, wherein the shock absorber houses the separating piston and is configured to induce the second force component by the displacement of the resting position of the separating piston, and wherein the bellows is connected to a chassis of the vehicle and to one end of a suspension arm, which is opposite the other end of the suspension arm, which is connected to a trestle connected to the chassis.

9. The axle assembly, comprising:

a trestle for connecting to a vehicle chassis;

a suspension arm for accommodating an axle of a vehicle, the suspension arm being movably connected to the trestle; and an axle-lifting device for lifting the axle, including a function mechanism for generating a force component in an axle-lifting direction, wherein the function mechanism is configured to generate a first force component to provide a first functionality and to generate a second force component in the axle-lifting direction to lift the axle, wherein the axle-lifting device is connected to the suspension arm;

wherein the function mechanism includes a separating piston, and wherein a variation in at least one of an internal fluid pressure and an internal fluid quantity distribution in the function mechanism causes a displacement in a resting position of the separating piston, the force component in the axle-lifting direction being generated as a function of the displacement, wherein a load state is proportional to the fluid pressure to provide direct control of the axle-lifting device, wherein the function mechanism is configured to provide another force component against the axle-lifting direction for providing the first functionality, wherein the function mechanism is configured as a bellows having a shock absorber, the first functionality being a shock-absorbing effect of the shock absorber and the first force component being a shock-absorbing force of the shock absorber, wherein the shock absorber houses the separating piston and is configured to induce the second force component by the displacement of the resting position of the separating piston, and wherein the bellows is connected to a chassis of the vehicle and to one end of the suspension arm, which is opposite the other end of the suspension arm, which is connected to the trestle connected to the vehicle chassis.

10. The axle assembly of claim 9, wherein the axle-lifting device is also connected to the trestle.

11. The axle assembly of claim 9, wherein the axle-lifting device is also connected to the chassis.

\* \* \* \* \*